United States Patent [19]
Grube

[11] Patent Number: 5,428,815
[45] Date of Patent: Jun. 27, 1995

[54] COMMUNICATION SYSTEM WITH GEOGRAPHIC REUSE DYNAMICALLY SENSITIVE TO COMMUNICATION UNIT TYPE

[75] Inventor: Gary W. Grube, Palatine, Ill.

[73] Assignee: Motorola, Inc., Schaumburg, Ill.

[21] Appl. No.: 693,200

[22] Filed: Apr. 30, 1991

[51] Int. Cl.6 .................................................. H04Q 7/36
[52] U.S. Cl. ..................... 455/33.1; 455/34.1; 455/56.1; 455/62; 379/59
[58] Field of Search ............ 379/59, 60; 455/33.1, 455/33.4, 34.1, 34.2, 53.1, 62, 63, 105, 56.1

[56] References Cited

U.S. PATENT DOCUMENTS

| | | | |
|---|---|---|---|
| 3,764,915 | 10/1973 | Cox et al. | 455/34.1 |
| 4,144,411 | 3/1979 | Frenkiel | 379/59 |
| 4,419,766 | 12/1983 | Goeken et al. | 379/59 |
| 4,736,453 | 4/1988 | Schloemer | 455/34.1 |
| 4,747,101 | 5/1988 | Akaiwa et al. | 379/59 |
| 4,794,635 | 12/1988 | Hess | 455/34.1 |
| 5,040,238 | 8/1991 | Comroe et al. | 455/33.4 |
| 5,047,762 | 9/1991 | Bruckert | 340/825.06 |
| 5,067,147 | 11/1991 | Lee | 379/59 |
| 5,123,112 | 6/1992 | Choate | 455/34.1 |
| 5,134,709 | 7/1992 | Bi et al. | 379/59 |
| 5,193,101 | 3/1993 | McDonald et al. | 455/33.1 X |
| 5,247,701 | 9/1993 | Comroe et al. | 455/56.1 X |
| 5,278,991 | 1/1994 | Ramsdale et al. | 455/56.1 X |

*Primary Examiner*—Edward F. Urban
*Attorney, Agent, or Firm*—Susan L. Lukasik

[57] ABSTRACT

Geographic reuse of frequencies within a multisite communication system are dynamically altered as a function of communication unit type. Since some communication unit types pose a smaller risk of interference, increased geographic reuse can be tolerated. Similarly, reuse can be diminished to accommodate communication unit types that pose a significant risk of interference over a wide geographic area.

7 Claims, 2 Drawing Sheets

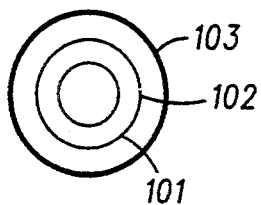
FIG.1
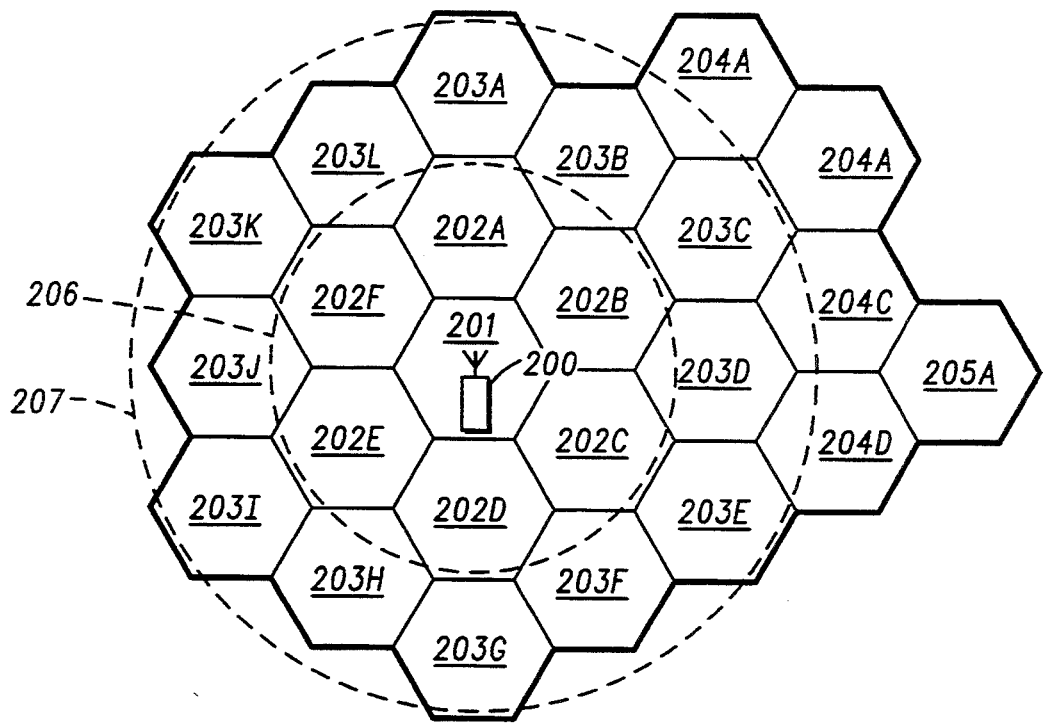

COMMUNICATION SYSTEM WITH GEOGRAPHIC REUSE DYNAMICALLY SENSITIVE TO COMMUNICATION UNIT TYPE

FIELD OF THE INVENTION

This invention relates generally to two-way communication systems having a plurality of communication unit types supported thereby, including but not limited to communication systems that make geographic reuse of spectral resources.

BACKGROUND OF THE INVENTION

Two-way radio communication systems that geographically reuse carrier frequencies that are used to support two-way communications are well known in the art and include, for example, cellular radio telephone systems. Other two-way communication systems, such as the SmartZone multisite trunked land mobile dispatch systems offered by Motorola, Inc., also make use of geographic reuse of transmit and receive frequencies.

Typically, reuse occurs pursuant to a reuse pattern; for example, both 7 cell and 4 cell reuse patterns are known in cellular telecommunications, as are other patterns. Such reuse patterns are typically based on a model representing ordinary (or perhaps worst case) use of such a system. Once selected, however, a particular model, and the system implementation based thereon, does not typically allow dynamic reorientation of the geographic reuse pattern or plan in response to varying system conditions; in particular, such reuse patterns represent a compromise, and therefore occasionally provide either too much or inadequate buffer zones between areas of frequency reuse during actual use.

The applicant has determined that the type of communication unit operating on an allocated frequency can have significant impact on the efficiency and/or protection offered by a particular reuse strategy. With reference to FIG. 1, a portable communication unit will typically have a relatively small effective coverage area (101), due to power limitations, antenna effectiveness, and so forth. A land vehicle mounted communication unit will, on the other hand, typically have a larger effective coverage area (102), due to typically increased power capabilities, better antenna structures and orientation, and the like. An airborne communication unit can exhibit an even greater increase in coverage area (103) due substantially to improved antenna placement.

With the above in mind, a fixed frequency reuse plan may make inefficient use at any given moment of available frequencies by providing too large a buffer zone when portable communication units are being supported, and similarly may allow interfering instances of reuse when accommodating an airborne communication unit.

Accordingly, the applicant has determined that a need exists for a methodology for dynamically altering frequency reuse patterns to accommodate differing communication unit types.

SUMMARY OF THE INVENTION

This need and others is substantially met through provision of the system and methodology disclosed herein. A plurality of radio communication sites are provided, wherein at least some of these sites have a plurality of frequencies potentially available for allocation to support communications amongst communication units of varying types. When, from time to time, one of these frequencies is assigned in a particular one of the radio communication sites to support the communication needs of a particular communication unit, the apparent availability of that assigned frequency in other communication sites is adjusted as a function, at least in part, of the communication unit type.

In one embodiment, the typical coverage patterns for varying types of communication units are considered, and frequency reuse is precluded in at least some communication sites based upon the pattern corresponding to the communication unit in question. So configured, communication sites relatively close to the site supporting the assigned frequency can be prevented from reusing the frequency when a portable communication unit is being supported, whereas other communication sites, which might otherwise be precluded when supporting a vehicle mounted communication unit or an airborne communication unit, could be allowed to reuse the same frequency, since such reuse will not likely lead to interference on that same frequency between the two sites.

BRIEF DESCRIPTION OF THE DRAWINGS

FIG. 1 comprises a top plan diagrammatic depiction of coverage patterns for different communication unit types;

FIG. 2 comprises a top plan diagrammatic view of a number of communication sites that form part of a radio communication system;

FIGS. 3 and 4 comprise tables illustrating alteration of frequency reuse in accordance with the invention.

DESCRIPTION OF A PREFERRED EMBODIMENT

Figure 5:
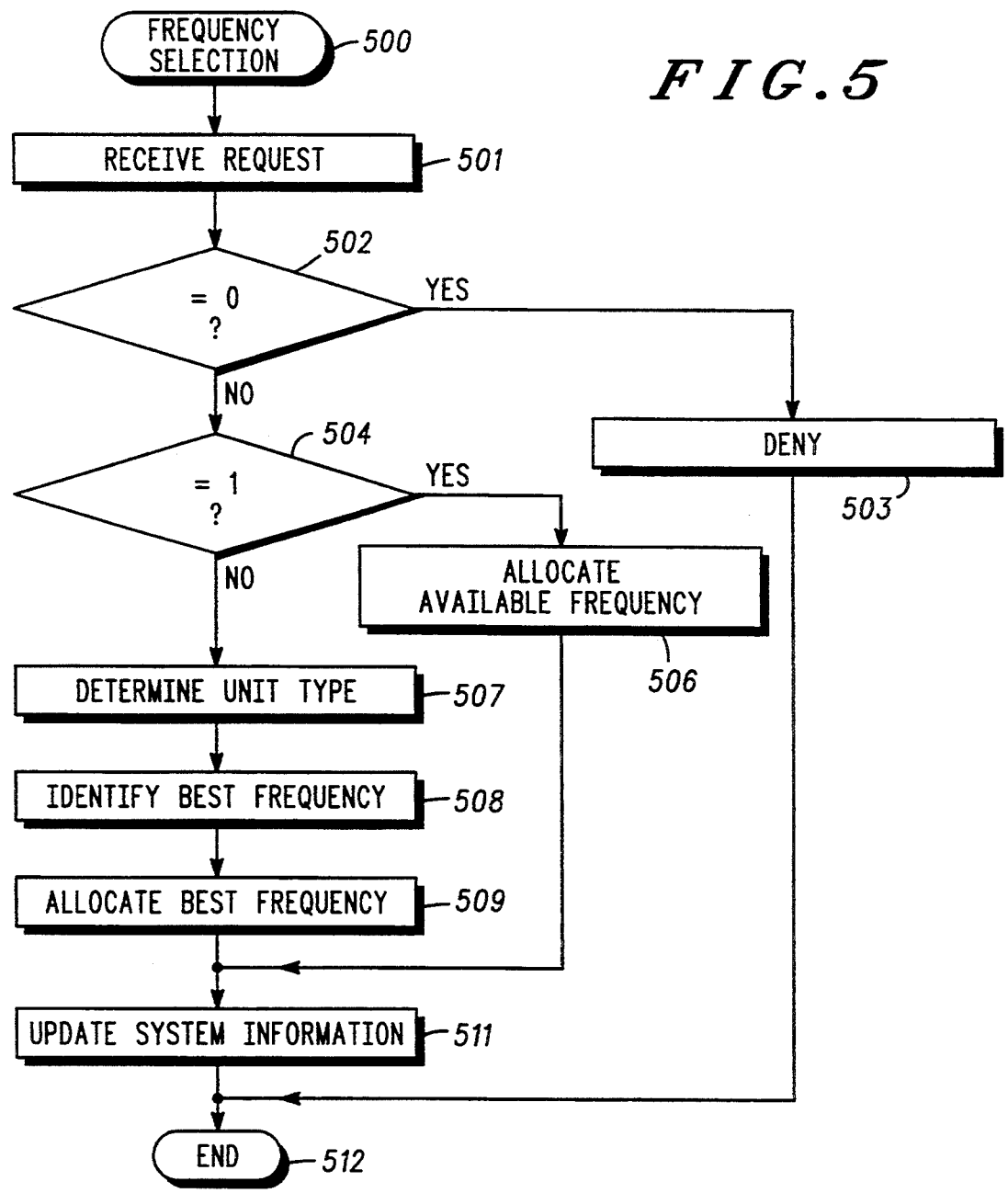
FIG. 5 comprises a flow diagram depicting frequency allocation in accordance with the invention.

FIG. 2 depicts a number of radio communication sites (201, 202A-F, 203A-L, 204A-D, 205A). In this embodiment, each site is provided with a plurality of radio frequencies that can, from time to time, be allocated for use by communication units within the coverage area of each particular communication site. The number of frequencies so provided can vary considerably with a number of factors as well understood in the art; for the sake of simplicity, it will be presumed here that each site has two frequencies that can be allocated. (It should also be understood that, in many such systems, frequencies will be allocated in pairs—one to support transmission and one to support reception. Again, frequency pair assignments are well within the auspices of these teachings, but allocation of only a single frequency will be referred to hereinafter for the sake of simplicity.)

As depicted, one of the communication sites (201) includes a communication unit (200) that requires allocation of a frequency to support its communication needs. Upon allocating a particular frequency within this host communication site (201) to support the desired communication, reuse of that same frequency within at least some of the other communication sites depicted should be prohibited in order to avoid interfering uses of that frequency.

Prior art methodology would preordain, via a fixed reuse pattern, such prohibitions. Pursuant to this embodiment, however, allocation of a particular frequency in the first communication site (201) to support the communication needs of the communication unit (200) will automatically cause the apparent availability of that same frequency to be adjusted in the other communication sites as a function of communication unit type. For example, since the communication site structure remains essentially fixed, allocation of a particular frequency in a particular site to support a particular type of communication unit can trigger preclusion of use of that same frequency in preidentified other sites, the latter being known both by individual identity and by groups.

For example, referring momentarily to FIG. 3, prior to allocation of any frequencies, system information can be retained (either in a distributed manner throughout the system or in a central hub or switch, all in accordance with well understood prior art architecture) reflecting current apparent availability of the two frequencies used throughout the system (for purposes of this example, frequencies A and B). Both frequencies are available for allocation in site 201, and also in sites 202A, 203A, and 205A. Upon allocating frequency A in site 201 to a portable communication unit, the availability of frequency A in adjacent site 202A is adjusted to indicate nonavailability (301). Since a portable communication unit typically has a relatively small associated coverage pattern, a predetermination can be made that communication sites other than immediately adjacent communication sites, such as sites 203A and 205A, can continue to hold frequency A available for allocation (302 and 303). And, of course, frequency B continues to remain available for allocation in any of the aforementioned sites.

By way of continued example, if the communication unit instead comprises a land vehicle mounted communication unit having a larger coverage pattern typically associated therewith, the allocated frequency A can be adjusted to nonavailable status (304 and 305) in both immediately adjacent sites, such as site 202A, and other, nearby sites, such as site 203A. Site 205A, being sufficiently distal from the host site (201), can continue to maintain the allocatability of frequency A.

In this way, greater reuse of a particular frequency can be tolerated when appropriate while greater protection can be assured when necessary.

In the alternative, instead of precluding allocation in the manner specifically set forth above, allocation can be precluded in those communication sites that are wholly or partially within a predetermined distance of the host communication site (201). For example, as depicted in FIG. 2, a first predetermined distance (206) would be used with a first type of communication unit, such as a portable unit, and a second predetermined distance (207) would be used with land vehicle mounted communication units. Yet a larger distance (not shown) would be used to accommodate an airborne communication unit.

In the embodiments described above, for each communication site a frequency is either indicated as being currently available or not available at any given moment. In another embodiment of the invention, this indication of current availability can comprise an availability factor, which availability factor is one of a plurality of factors within a range of factors. The range of factors effectively represents a range of interference that will likely result upon using a given frequency in a given communication site at a given moment. For example, if a particular frequency is assigned in a particular communication site to support an airborne communication unit, there is a high likelihood that interference would result if that same frequency were reused in an immediately adjacent communication site to support a different communication. That likelihood of interference drops as distance between the host communication site and the reuse site increases. The availability factor reflects this likelihood of interference.

Referring to FIG. 4, with both frequencies A and B being unassigned in all 4 sites depicted, each frequency has an availability factor of "9" in each site, therefore representing a highest degree of availability (presuming here for the sake of example a range of 0 to 9). If frequency A is then assigned to support the communication needs of a portable communication unit in site 201, the availability factor drops to zero (401) in immediately adjacent site 202A. In the next adjacent site (203A), however, the availability factor only drops to 5 (402). The availability factor for frequency A in more distant sites, such as site 205A, remains at 9 (403). The zero rating in the adjacent site (202A) indicates that frequency A should not be allocated in that communication site, since interference will likely occur. The 5 rating in the next adjacent site (203A), however, would allow for allocation if necessary, but provides a helpful measurement by which frequency resources can most effectively be assigned. For example, if a communication unit now requires a frequency in site 203A, both frequencies A and B are considered as candidates. All other things being equal, frequency B represents the better candidate, since it has a higher availability factor associated therewith.

By way of further example, if the host site (201) should allocate its frequency A to a land vehicle mounted communication unit, the availability factor for both the adjacent and next adjacent sites (202A and 203A) will drop to zero (404), and the availability factor in more distant sites, such as site 205A, will be impacted considerably less (405).

The precise degree to which the availability factors are adjusted upon assigning a frequency on a particular communication site to a particular communication unit will of course vary with the application. Different systems support different types of communication units, and even within a particular system, communication unit types can vary amongst themselves. For example, power capability of various vehicle mounted communication units can vary from a few watts to 100 watts or potentially more. Therefore, the specific availability factor variations set forth here may not be particularly appropriate for use in a specific application but are intended instead to convey, in a simple and clear manner, an essential embodiment in accordance with the invention.

As briefly alluded to above, frequency allocation from amongst a plurality of candidate frequencies within a particular communication site can be favorably directed in accordance with this invention. By way of further example, a particular frequency selection methodology (500) appears in FIG. 5. Upon receiving a request, or other indication of need for a communication resource (501), a communication site will determine whether it has any candidate frequencies (502). If no frequencies are currently available, the request will be denied (503). (Depending upon the system, the request may then be queued, or other appropriate actions taken.) Presuming that there is at least one available frequency, the site will then determine whether there is only one candidate frequency (504). If so, that frequency will be allocated (506), and system information regarding the allocation will be updated (511) as suggested above, such that the availability factors for other communication sites can be adjusted accordingly. If the communication site has more than one candidate frequency, the communication site will consider the type of communication unit involved (507) and identify a best frequency to support the communication needs of the communication unit (508). For example, as noted earlier, the communication site can simply identify whichever of its candidate frequencies has a highest availability factor, and identify that frequency as the best frequency.

Other more sophisticated considerations can be supported as well. For example, if the host communication site has two frequencies available for allocation, with one having a higher availability factor, and the other having a lower, but still satisfactory availability factor, the host communication site can consider the current availability conditions in other sites. If an adjacent communication site has only one frequency currently available for application, and if availability of that one frequency will be significantly impacted by allocation in the host communication site of that frequency, then assignment in the host communication site of that particular frequency will usurp availability of communication capabilities in that adjacent site. To prevent this, the host communication site can allocate instead its second frequency, even if that second frequency has a lower availability factor, thereby assuring that the adjacent communications site retains current additional communications capacity.

After identifying the best frequency, the communication site allocates that frequency (509) to support the necessary communication, and system information is updated (511) as described above. The frequency selection process then concludes (512).

So configured, frequency reuse can be dynamically altered as a function of communication unit type. Those communication units that represent a smaller likelihood of interference allow for greater reuse opportunities, and this system acts accordingly. Similarly, other communication units that pose increased likelihood of interference over a wider area are accommodated as well.

Those skilled in the art will recognize that a variety of factors can be considered when distinguishing one type of communication unit from another. Portables and land vehicle mounted communication units differ from each other in a variety of ways. Similarly, as also noted earlier, land vehicle mounted communication units can vary significantly from one model to another, or for other reasons. Ultimately, if desired, each individual communication unit could be individually characterized with respect to its coverage pattern, such that each communication unit could be individually and uniquely responded to in accordance with the methodology specified herein.

It should also be noted that there are a variety of ways for the communication sites to ascertain the type of communication unit that is requesting communication services. Presently, in most communication systems, the communication units identify themselves through use of an identification number. This identification number can either be revised to indicate type, or the communication sites can be equipped with an appropriate look-up table such that the identification number for a requesting communication unit can be correlated with a particular communication unit type through access to the look-up table.

What is claimed is:

1. A frequency reuse method for use with a plurality of communication units, the plurality of communication units including at least a first type of communication unit and a second type of communication unit, wherein the first type of communication unit comprises a portable two-way radio, and the second type of communication unit comprises a land vehicle mounted two-way radio, the method comprising the steps of:
   A) providing a plurality of radio communication sites, wherein at least some of the radio communication sites have a plurality of frequencies potentially available for allocation to support communications amongst the communication units;
   B) assigning, in one of the radio communication sites, at least a particular frequency to support communication needs of a particular communication unit;
   C) adjusting availability of that particular frequency in other of the communication sites as a function, at least in part, of whether the particular communication unit is the first type of communication unit or the second type of communication unit.

2. A frequency reuse method for use with a plurality of communication units, the communication units including at least a first type of communication unit, a second type of communication unit, and a third type of communication unit wherein the first type of communication unit comprises a portable two-way radio, the second type of communication unit comprises a land vehicle molted two-way radio and the third type of communication unit comprises an airborne two-way radio the method comprising the steps of:
   A) providing a plurality of radio communication sites, wherein at least some of the radio communication sites have a plurality of frequencies potentially available for allocation to support communications amongst the communication units;
   B) assigning, in one of the radio communication sites, at least a particular frequency to support communication needs of a particular communication unit; and
   C) adjusting availability of that particular frequency in other of the communication sites as a function, at least in part, of whether the particular communication unit is the first type, the second type, or the third type of communication unit.

3. The method of claim 2, wherein the first type of communication units have a corresponding first coverage pattern, the second type of communication units have a corresponding second coverage pattern, and the third type of communication units have a corresponding third coverage pattern, and wherein the step of adjusting availability of that particular frequency in other of the communication sites as a function, at least in part, of whether the particular communication unit is the first type, the second type, or the third type of communication unit includes the step of:
   C1) precluding allocation of the particular frequency in at least some of the other communication sites based upon the first, second, and third coverage pattern.

4. The method of claim 3, wherein the first coverage pattern is smaller than the second coverage pattern, and the second coverage pattern is smaller than the third coverage pattern, and wherein the step of precluding allocation of the particular frequency in at least some of the other communication sites based upon the first, second, and third coverage pattern includes the steps of:

C1a) precluding allocation of the particular frequency in a first predetermined number of communication sites when the particular communication unit comprises the first type of communication unit;

C1b) precluding allocation of the particular frequency in a second predetermined number of communication sites when the particular communication unit comprises the second type of communication unit; and C1c) precluding allocation of the particular frequency in a third predetermined number of communication sites when the particular communication unit comprises the third type of communication unit; wherein the first predetermined number is less than the second predetermined number, and the second predetermined number is less than the third predetermined number.

5. The method of claim 3, wherein the first coverage pattern is smaller than the second coverage pattern, and the second coverage pattern is smaller than the third coverage pattern, and wherein the step of precluding allocation of the particular frequency in the other communication sites based upon the first, second, and third coverage pattern includes the steps of:

C1a) precluding allocation of the particular frequency in those communication sites that are within a first predetermined distance of the particular communication site when the particular communication unit comprises the first type of communication unit;

C1b) precluding allocation of the particular frequency in those communication sites that are within a second predetermined distance of the particular communication site when the particular communication unit comprises the second type of communication unit; and C1c) precluding allocation of the particular frequency in those communication sites that are within a third predetermined distance of the particular communication site when the particular communication unit comprises the third type of communication unit; wherein the first predetermined distance is less than the second predetermined distance, and the second predetermined distance is less than the third predetermined distance.

6. The method of claim 5, wherein the step of adjusting availability of that particular frequency in other of the communication sites as a function, at least in part, of whether the particular communication unit is the first type, second type, or third type of communication unit includes the step of maintaining system information, which information includes, for each of the communication sites, an identification of frequencies supported by that site, and an indication of current availability of such frequencies by such site.

7. The method of claim 6, wherein the indication of current availability comprises an availability factor, which availability factor is one of a plurality of factors within a range of factors, wherein the range of factors represents a range of interference that will likely result upon using a given frequency in a given communication site at a given moment.

* * * * *